US007337455B2

(12) United States Patent
Agnihotri et al.

(10) Patent No.: US 7,337,455 B2
(45) Date of Patent: Feb. 26, 2008

(54) METHOD, APPARATUS, AND PROGRAM FOR EVOLVING ALGORITHMS FOR DETECTING CONTENT IN INFORMATION STREAMS

(75) Inventors: Lalitha Agnihotri, Fishkill, NY (US); J. David Schaffer, Wappingers Falls, NY (US); Nevenka Dimitrova, Yorktown Heights, NY (US); Thomas McGee, Garrison, NY (US); Sylvie Jeannin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1075 days.

(21) Appl. No.: 10/029,916

(22) Filed: Dec. 31, 2001

(65) Prior Publication Data

US 2003/0126598 A1    Jul. 3, 2003

(51) Int. Cl.
*H04N 7/10* (2006.01)
*H04N 7/025* (2006.01)
(52) U.S. Cl. .......................................... 725/32; 725/36
(58) Field of Classification Search ................. 725/32, 725/36, 22, 17; 706/13
See application file for complete search history.

(56) References Cited

U.S. PATENT DOCUMENTS

| | | | | |
|---|---|---|---|---|
| 4,314,285 A | | 2/1982 | Bonner et al. ................. 360/33 |
| 5,086,479 A | * | 2/1992 | Takenaga et al. ............ 382/157 |
| 5,151,788 A | | 9/1992 | Blum .......................... 358/188 |
| 5,333,091 A | | 7/1994 | Iggulden et al. ............ 360/14.1 |
| 5,390,283 A | | 2/1995 | Eshelman et al. ............ 395/13 |
| 5,621,454 A | * | 4/1997 | Ellis et al. ..................... 725/22 |
| 6,100,941 A | | 8/2000 | Dimitrova et al. .......... 348/700 |
| 6,366,296 B1 | * | 4/2002 | Boreczky et al. ........... 715/719 |
| 6,577,346 B1 | * | 6/2003 | Perlman ...................... 348/460 |
| 6,957,200 B2 | * | 10/2005 | Buczak et al. ................ 706/13 |

FOREIGN PATENT DOCUMENTS

EP    0735754 A2    2/1996

OTHER PUBLICATIONS

Eshelman, The CHC Adaptive Search Algorithm: How to Have Safe Search When Engaging In Nontraditional Genetic Recombination, Foundations of Genetic Algorithms, 1991, pp. 265-283.
S. Russell et al., "Genetic Algorithms and Evolutionary Programming", Artificial Intelligence: A Modern Approach, 1995, Ch. 20.8, pp. 619-621.
J.D. Schaffer et al., "Using Genetic Search To Exploit The Emergent Behavior of Neural Networks", Emergent Computation Conference, 1989, MIT Press, pp. 1-8.
Valkealahti et al: "Reduced multidimensional histograms in color texture description" Pattern Recognition, 1998. Proceedings. Fourteenth International Conference On Brisbane, QLD., Australia, Aug. 16, 1998, pp. 1057-1061.
Lienhart et al: "On the detection and recognition of television commercials" Multimedia Computing And Systems '97. Proceedings., IEEE International Conference On Ottawa, Ont., Canada, Jun. 3, 1997, pp. 509-516.

* cited by examiner

*Primary Examiner*—Hunter B. Lonsberry

(57) ABSTRACT

A method for optimizing the performance of an algorithm for detecting predetermined content in a media information stream, and a program and apparatus that operate in accordance with the method. The algorithm is a function of a set of parameters. The method comprises the steps of performing the algorithm at least once to detect the predetermined content in the media information stream, while employing a respective set of parameters in the algorithm for each performance thereof, and automatically evolving at least one respective set of parameters employed in the algorithm to maximize the degree of accuracy at which the algorithm detects the predetermined content in the media information stream.

39 Claims, 6 Drawing Sheets

| Cr# | SeparationThld | UnicolorInSuccThld | MinCommercialThld | MaxCommercialThld | RestartThld | DisForSuccThld |
|---|---|---|---|---|---|---|
| C1 | ST1 | UIST1 | MinCT1 | MaxCT1 | RT1 | DFST1 |
| C2 | ST2 | UIST2 | MinCT2 | MaxCT2 | RT2 | DFST2 |
| Crn | STn | UISTn | MinCTn | MaxCTn | RTn | DFSTn |

FIG. 2

Fig. 5a
$C_{r1}$ (7,0,4)   1 1 1 0 | 0 0 1 0 0
$C_{rn}$ (1,6,2)   0 0 1 1 | 1 0 0 1 0
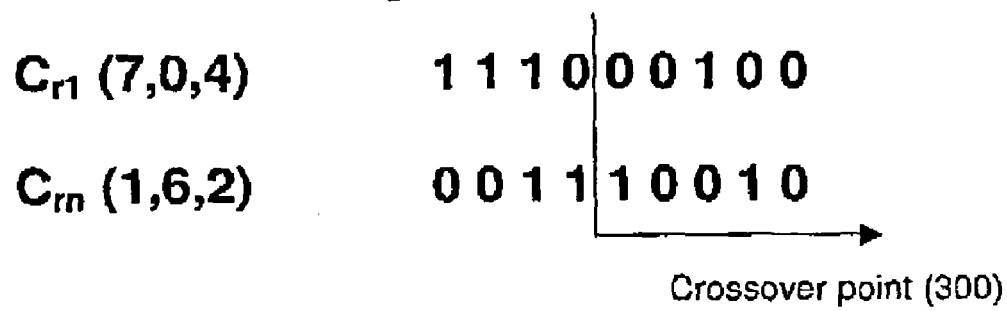
Crossover point (300)
Fig. 5b
$C_{rk1}$ (7,2,2)   1 1 1 0 1 0 0 1 0
$C_{rk2}$ (1,4,4)   0 0 1 1 0 0 1 0 0
Fig. 5c
$C_{r1}$ (7,0,4)   1 1 1 0 0 0 1 0 0
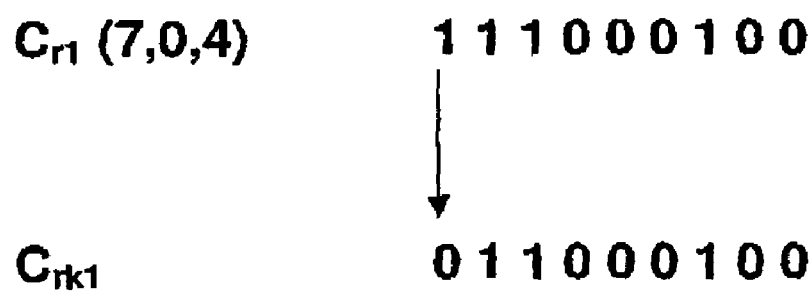
$C_{rk1}$   0 1 1 0 0 0 1 0 0

METHOD, APPARATUS, AND PROGRAM FOR EVOLVING ALGORITHMS FOR DETECTING CONTENT IN INFORMATION STREAMS

This invention relates generally to the detection of commercials or other predetermined content in video information streams, using a search algorithm, and in particular to a method, apparatus, and program for evolving algorithm parameters to accurately detect transitions from one type of content to another type of content, using a search algorithm, such as a genetic algorithm.

RELATED ART

Personal video receivers/recorders and devices that modify and/or record the content of broadcast video are becoming increasingly popular. One example is a personal video recorder that automatically records programs on a hard disk based on preferences of a user. One of the features under investigation for such systems is content detection. For example, a system that can detect commercials may allow substitute advertisements to be inserted in a video stream ("commercial swapping") or the temporary halting of the video at the end of a commercial to prevent a user, who was distracted during a commercial, from missing any of the main program content. Content detection also may enable users who are not interested in the content of commercials or promotions interposed within a recorded television program, to skip through those commercials either manually or by using a device designed to perform skipping automatically (see, e.g., U.S. Pat. No. 5,151,788).

There are many known methods for detecting commercials. One method is the detection of a high cut rate or sudden change in a scene with no fade or movement transition between temporally-adjacent frames. Cuts can include fades so the cuts do not have to be hard cuts. A more robust criterion may be high transition rates. Another indicator is the presence of a black frame (or unicolor/monochrome frame) coupled with silence, which may indicate the beginning of a commercial break. One or more black frames are usually found immediately before and after an individual commercial segment. Another known indicator of commercials is high "activity", which is the rate of change in the luminance level between two different sets of frames. In commercials, objects and scenes generally move faster and change more frequently than during non-commercial video segments, and thus commercials typically are filled with "activity". When a low amount of activity is detected, the commercial is deemed to have ended, and a resumption in recording may follow.

Another known technique is to measure the temporal distance between black frame sequences to determine the presence of a commercial, based on whether the measured temporal distance exceeds or is less than a predetermined threshold. Still another technique identifies commercials based on matching images, wherein differences in the quality of image content is used as an indicator.

Another technique for identifying a black frame such as disclosed in U.S. Pat. No. 4,314,285 by Bonner et al., senses a drop in the voltage level of the input signal below a threshold. Yet another technique, such as disclosed in U.S. Pat. No. 5,333,091 by Iggulden et al., is to record an entire program including any commercials. A notation is made whenever a black frame is broadcast. After recordation, a processor determines whether the time period in between black frames was a commercial or a program. This is accomplished by a simple formula. If the time period is less than a threshold of five minutes, there is deemed to be a commercial. During playback, the device fast-forwards the tape past the areas determined to be commercials. Unfortunately, the presence of two black frames within five minutes of each other is not necessarily representative of a commercial as this could occur during a dimly lit or dark scene.

While all of the techniques referred to above show promising results and may be well-suited for their intended purposes, their reliability and accuracy in detecting content such as commercials can be wanting in at least some cases. One important factor that can contribute to this problem is the use of inappropriate or non-optimum algorithm parameters, such as threshold values, in those techniques. Since it can be difficult to pre-select the most appropriate parameter values for use in a content detection technique, especially when the parameter selection is performed manually, it cannot be assured that the selected values will be best suited for enabling the technique to yield highly accurate results. Also, even in cases where optimum parameter values are employed, commercial producers can change various commercial features to render those values obsolete, and thereby prevent the commercial detection algorithms from successfully detecting commercial content. There is a need, therefore, to provide a technique which overcomes these problems by automatically learning optimum parameter values to be used in a video content detection algorithm, based on an application of that algorithm to a selected video stream, and which thereby enables predetermined content included the video stream to be detected accurately and reliably.

SUMMARY OF THE INVENTION

It is an object of this invention to provide a method, apparatus, and program for automatically learning parameter values which are optimized to enable a media content detection algorithm that is a function of those parameters to detect predetermined content in a media information stream.

It is another object of this invention to provide a method, apparatus, and program which perform an algorithm for evaluating video or other media information streams for the presence of predetermined content, such as commercials, and which automatically vary parameters of the algorithm until values are determined which enable the algorithm to detect the predetermined content with a maximum degree of accuracy.

Further objects and advantages of this invention will become apparent from a consideration of the drawings and ensuing description.

The foregoing objects of the invention are realized by a method for optimizing the performance of an algorithm for detecting predetermined content, such as one or more commercials, in a media information stream (e.g., a video information divided into a plurality of frames, and/or audio information, etc.), and a program and apparatus that operate in accordance with the method. The algorithm is a function of a set of parameters, wherein each set is also referred to herein as a chromosome, and each parameter preferably is a threshold value representing a condition that, depending on whether or not satisfied, tends to indicate whether or not predetermined subject matter (e.g., commercial or other subject matter) is present in the media information stream.

In accordance with an embodiment of this invention, the method comprises the steps of performing the algorithm at least once to detect the predetermined content in the media information stream, while employing a respective set of parameters in the algorithm for each performance thereof, and automatically evolving at least one respective set of parameters employed in the algorithm to maximize the degree of accuracy at which the algorithm detects the predetermined content in the media information stream.

In accordance with an aspect of this invention, the algorithm detects the predetermined content, which may be desired or undesired content, based on a detection of at least one of a black frame/unicolor frame among the plurality of frames, an average cut frame distance, an average cut frame distance trend, a brand name, a cut and black frame, an average intensity color histogram, audio silence, a change in volume, frame similarity, character detection, a static image, or any other types of features of interest that may indicate the presence of predetermined content in a video or other type of media information stream.

In accordance with another aspect of this invention, the step of automatically evolving includes performing a search algorithm, preferably a genetic algorithm, to evolve the at least one respective set of parameters.

In one embodiment of the invention, the evolving includes the steps of determining the accuracy at which the algorithm detects the predetermined content in the media information stream for each performance of the algorithm, selecting at least one of the respective sets of parameters, based on a result of the step of determining the accuracy, and producing at least one offspring set of parameters, based on the at least one set of parameters selected in the selecting step. The offspring set(s) of parameters and/or original set(s) of parameters determined to yield the most accurate results are then employed in further, respective performances of the algorithm, and one or more further offspring sets of parameters are produced again, if needed, until a set of parameters which substantially maximizes the accuracy of the algorithm's performance is determined.

After such a high performance (also referred to as "optimum") set of parameters has been identified, that set can be used in the corresponding algorithm in any device, for enabling predetermined content in a media information stream to be successfully and accurately detected. The algorithm can reside on a server and/or in local information appliances, and the set of parameters and/or algorithm itself can be downloaded from the server to the local information appliances or vice versa.

BRIEF DESCRIPTION OF THE DRAWINGS

The present invention will be more readily understood from a detailed description of the preferred embodiments taken in conjunction with the following figures:

FIG. 2 is an example of a plurality of chromosomes Cr1-Crn that may be stored in a memory 15 of the server 2 and/or a memory 18 of the user information appliance 4 of FIG. 1, wherein the chromosomes Cr1-Crn each include parameter or threshold values that are suitable for use in an algorithm for detecting predetermined content, such as commercials, in a video or other media information stream.

FIGS. 5a and 5b show an example of chromosomes that may be employed in the method of FIG. 3, wherein FIG. 5a shows a representation of a cross-over point, and FIG. 5b represents an example of a gene mutation of a chromosome.

FIG. 5C shows an example of one of the parent chromosomes Cr1 of FIG. 5a and an offspring chromosome Crk1 resulting from the mutation of that parent chromosome.

Identically labeled elements appearing in different ones of the figures refer to the same elements but may not be referenced in the description for all figures.

DETAILED DESCRIPTION OF THE PREFERRED EMBODIMENTS

Figure 1:
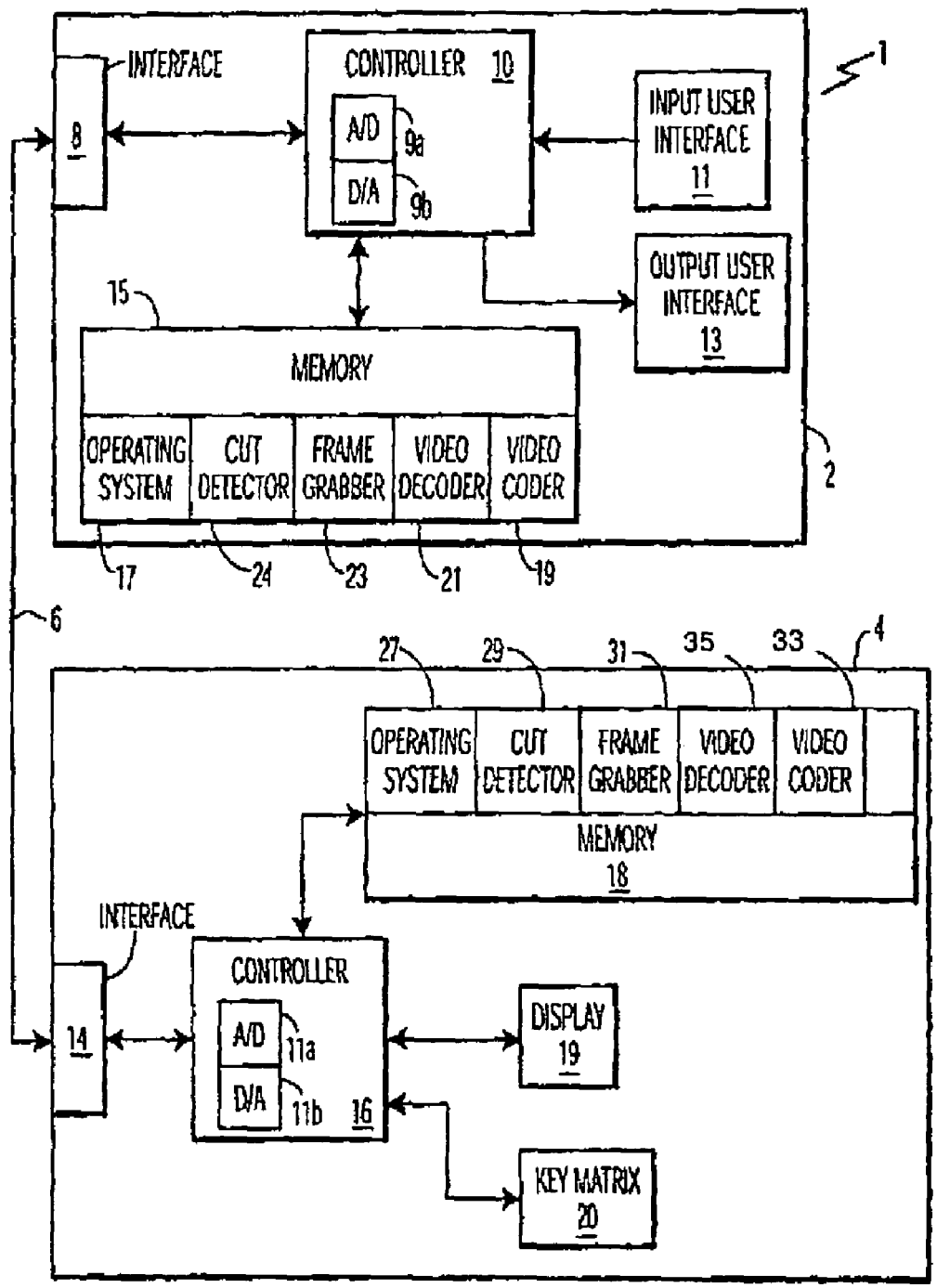
FIG. 1 is a block diagram of a hardware system 1 that is suitable for practicing this invention, wherein the system 1 comprises a server 2 and at least one user information appliance 4 that are constructed and operated in accordance with this invention, and which are bidirectionally coupled together through an interface 6.

FIG. 1 is a block diagram of a hardware system 1 that is suitable for practicing this invention. In the illustrated embodiment, the system 1 comprises a server 2 and at least one user information appliance 4. The server 2 and information appliance 4 are bidirectionally coupled to one another through an interface 6. The interface 6 may include various types of interconnecting equipment and interfaces for coupling the server 2 to the information appliance 4, such as, for example, one or more wires, cables, switches, routers, optical fibers, a wireless interface, and/or one or more networks (e.g., the Internet and/or other, proprietary network(s)), modems, and/or other suitable types of communication equipment/interfaces, depending on applicable system design and operating criteria, although, for convenience, no such equipment is shown in FIG. 1.

The individual information appliance 4 may include, for example, a PC, a personal video recorder (PVR), a video cassette recorder (VCR), a digital video recorder (DVR), a personal television receiver (PTR), a DVD player, and the like, although other suitable types of user information appliances also may be employed. Although only a single server 2 and a single user information appliance 4 are shown in FIG. 1, the number and variety of user information appliances that may be in communication with the server 2 can vary widely, as can the number of servers 2 that are in communication with individual user information appliances, depending upon, for example, user needs and geographic location(s), applicable system design and operating criteria, etc. It should be noted that the teaching of this invention is not to be construed as being limited for use with any particular type of server computer or information appliance. In general, the teaching of this invention may be employed in conjunction with any suitable type of devices that are capable of processing media information, such as video information, audio information, and/or combination video/audio information, etc.

The server 2 is a computer or farm of computers that facilitate the transmission, storage, and reception of information between different points. The server 2 preferably comprises a controller (such as one or more microprocessors and/or logic arrays) (CPU) 10 for performing arithmetic and/or logical operations required for program execution. The controller 10 executes computer readable code, i.e., stored applications, such as those described below. The server 2 also comprises at least one communication interface 8 for bidirectionally coupling the controller 10 to external interfaces, such as the interface 6 and any other interfaces (not shown) to which the server 2 may be coupled, for enabling the server 2 to transceive information with external source and destination devices (e.g., information appliance 4) coupled those interfaces, although for convenience, only the interface 6 and appliance 4 are shown. That information may include signaling information in accordance with the applicable external interface standard employed, video, audio, and other data.

The server 2 preferably also comprises one or more input user-interfaces 11 that are each coupled to the controller 10, and at least one output user-interface 13 that also is coupled to the controller 10. The input user-interface 11 may include, for example, a keyboard, a mouse, a trackball, touch screen, and/or any other suitable type of user-operable input device(s), and the output user-interface 13 may include, for example, a video display, a liquid crystal or other flat panel display, a speaker, a printer, and/or any other suitable type of output device(s) for enabling a user to perceive outputted information.

The server 2 preferably also comprises one or more associated memories (e.g., disk drives, CD-ROM drives, read-only memories, and/or random access memories) 15 that are bidirectionally coupled to the controller 10. The memory 15 stores temporary data and instructions, and also stores various application programs, routines and operating programs that are used by the controller 10 for controlling the overall operation of the server 2. For example, an operating system 17 such as UNIX or Windows NT, preferably is stored in the memory 15, and a number of applications such as, for example, a video encoder 19, a video decoder 21, a frame grabber 23, and a cut detector 24 also may be stored in the memory 15, although other types of operating systems and application software may be employed as well, and/or one or more of the applications, such as applications 19, 21, and 23, may be embodied as separate hardware components within the server 2, rather than as application software. The video encoder 19 is employed by the controller 10 to encode video information in a conventional manner, when deemed necessary by the controller 10, and the video decoder 21 is employed by the controller 10 to decode compressed video data, when deemed necessary by the controller 10, in a conventional manner. The frame grabber 23 includes software that is employed by the controller 10 to capture single frames from a video information stream for enabling the captured frames to be subsequently processed. The cut detector 24 detects, for example, whether a change in scene has occurred, in a known manner.

In accordance with one embodiment of the invention, the memory 15 also stores various counters and variables, such as, for example, an Actual#CommFrames variable, a CommercialProbability variable, a TotalIdentified counter, a Last UniColor variable, and a #CorrIdentified counter, which are employed in a manner as will be described below. Preferably, the memory 15 also stores routines for implementing a method in accordance with this invention for detecting predetermined content, such as, for example, commercials or other content, in video information streams using a predetermined content detection algorithm that is a function of a number of parameters (e.g., threshold values), and for automatically learning values of those parameters which are optimized to enable the content detection algorithm to detect the predetermined content with at least a predetermined level of accuracy. That method will be described below in relation to FIGS. 3, 4a, and 4b.

In accordance with an aspect of this invention, the memory 15 preferably also stores a plurality of chromosomes that are employed in the routines for implementing the method of the invention. Each chromosome preferably includes one or more of the parameters, which are of a type suitable for use in the predetermined content detection algorithm referred to above. In accordance with an aspect of this invention, at least part of the content detection algorithm performs a technique, such as, for example, an average cut frame distance detection technique, an average cut frame distance trend detection technique, a brand name detection technique, a black frame detection technique, a cut and black frame detection technique, a frame similarity detection technique, a character detection technique, an average intensity color histogram technique, a static image detection technique, or any other existing or later developed techniques which can be used for detecting predetermined content in media information streams. For a description of at least some of those techniques, reference maybe had to (1) U.S. Pat. No. 6,100,941, issued on Aug. 8, 2000, entitled "Apparatus and Method for Locating a Commercial Disposed Within a Video Data Stream," by Nevenka Dimitrova, Thomas McGee, Herman Elenbaas, Eugene Leyvi, Carolyn Ramsey, and David Berkowitz (hereinafter "U.S. Pat. No. 6,100,941"), (2) U.S. patent application Ser. No. 09/417,288, filed Oct. 13, 1999, entitled "Automatic Signature-Base Spotting, Learning and Extracting of Commercials and Other Video Content," by Nevenka Dimitrova, Thomas McGee, and Lalitha Agnihotri (hereinafter "U.S. patent application Ser. No. 09/417,288"), and (3) U.S. patent application Ser. No. 09/854,511, filed May 14, 2001, entitled "Video Content Detection Method And System Leveraging Data-Compression Constructs", each of which is incorporated by reference herein in its entirety, as if fully set forth herein.

Referring to FIG. 2, an example is shown of the plurality of chromosomes stored in the memory 15, wherein, in this example, the chromosomes are identified as Cr1-Crn and are suitable for use in an algorithm for detecting commercial content in a video information stream, based on a black frame/unicolor frame detection technique. Each chromosome Cr1-Crn includes a plurality of parameters, namely threshold values, of which the algorithm is a function. The thresholds represent conditions that, depending on whether or not satisfied, indicate the presence or absence of commercial content. Preferably, the thresholds are represented by a bit string having a predetermined bit length (e.g., 9 bits), although in other embodiments, other suitable types of values may be employed instead of bit strings, depending on applicable operating criteria. The following is an example of thresholds used in an algorithm for detecting commercial content in a video information stream, although it should be noted that other thresholds besides those defined below may be employed instead and/or in addition to those thresholds, depending on, for example, the type of content detection algorithm being employed.

SeparationThreshold (shown as "SeparationThld" in FIG. 2)—this threshold represents a predetermined minimum temporal distance that can be expected to exist between two commercials, and enables a detection to be made of a black/unicolor frame which precedes a potential beginning frame of a commercial segment (i.e., a frame including commercial content) in a video information stream. As will be described below, a black/unicolor frame can be preliminarily identified as such a preceding frame of a commercial segment if the temporal distance between that frame and a black/unicolor frame which was previously detected as immediately following a last detected commercial segment is greater than the value of SeparationThreshold (as used herein, the term "commercial segment" means a collection of successive frames which include commercial content, and which form a single commercial).

UnicolorInSuccThreshold (shown as "UnicolorInSucc Thld" in FIG. 2)—This threshold represents the minimum number of black/unicolor frames expected to be separating commercial segments or commercial and non-commercial program segments. The occurrence of a potential commercial ending can be recognized if the number of black/unicolor frames detected in succession (after a last frame of commercial segment) is greater than UnicolorInSuccThreshold, as will be described below.

MinCommercialThreshold (shown as "MinCommercialThld" in FIG. 2)—This threshold represents a predetermined, expected minimum amount of time of an individual commercial segment, and is used in determining whether a potential commercial start and a potential commercial ending determination should not be confirmed. Potential commercial starts and endings are not confirmed if it is determined that the temporal distance separating them is less than the value of MinCommercialThreshold.

MaxCommercialThreshold (shown as "MaxCommercialThld" in FIG. 2)—This threshold represents a predetermined, expected maximum amount of time of an individual commercial segment, and also is used in determining whether a potential commercial start and a potential commercial ending determination should not be confirmed. Potential commercial starts and endings are not confirmed if it is determined that the temporal distance separating them is greater than the value of MinCommercialThreshold.

RestartThreshold (shown as "RestartThld" in FIG. 2)—This threshold represents a predetermined number of frames which are reasonably expected to be included in a commercial segment (once a commercial segment has started). If the temporal distance between a current frame and a last detected commercial exceeds that threshold during the performance of the method described below, then no confirmation is made that the potential commercial segment is indeed a commercial.

DistForSuccThreshold (shown as "DistForSuccThld" in FIG. 2)—This threshold corresponds to a maximum, expected commercial duration, and represents a predetermined, maximum expected temporal distance between two consecutive black/unicolor frames separating consecutively detected commercials. As will be described in further detail below, this threshold is employed to (1) determine whether or not a detected black/unicolor frame immediately succeeds a previously detected one (a detected black/unicolor frame is considered to be in succession with the previously detected one of those frames if the frame are temporally separated by less than the value of DistForSuccThreshold), (2) detect a first black/unicolor frame immediately following a commercial ending frame (this occurs if the temporal distance between two successively detected black frames is greater than the product of 2*DistForSuccThreshold), and (3) determine whether or not a potential commercial start or ending determination should be confirmed.

The manner in which the various chromosome threshold values described above are employed in an exemplary embodiment of this invention will be described in detail below.

Referring again to FIG. 1, other components of the server 2 will now be described. Video information originated from a source device, such as the information appliance 4 or some other device (e.g., a video camera, etc.) (not shown) may be provided to the server 2 and inputted therein through the at least one communication interface 8. The inputted video information may be digital or analog information, and may be in compressed or uncompressed form, depending on, for example, the type of source device and associated external interface employed. An A/D converter 9a and a D/A converter 9b preferably also are included in the server 2, either as part of the controller 10 or as separate components. The A/D converter 9a can be programmed by the controller 10 for enabling analog information received from an external interface, such as interface 6, to be converted into digital form. The D/A converter 9b can be used by the controller 10 to convert digital information into corresponding analog information, before the information is outputted to the external interface 6, although, depending on the type of interface employed, that information need not be so converted before being forwarded to the interface 6.

As pointed out above, the controller 10 also may employ the video decoder 21 to decode compressed video information inputted thereto, depending on applicable performance criteria, and may employ the video encoder 19 to encode video information before it is transmitted through the communication interface 8, depending on applicable performance criteria.

Having described the server 2, the user information appliance 4 will now be described. The user information appliance 4 preferably comprises at least one communication interface 14 and a controller 16 (CPU) bidirectionally coupled thereto. The interface 14 bidirectionally couples the appliance 4 to one or more external communication interfaces, such as the interface 6 and any other external interfaces (not shown) to which the information appliance 4 may be coupled. The interface 14 enables the appliance 4 to transceive information with external source and destination devices (e.g., server 2) that may be coupled thereto, although for convenience, only the server 2 and one external interface 6 are shown. That information may include signaling information in accordance with the applicable external interface standard employed, video, audio, and other data.

A user interface of the user information appliance 4 includes an output user interface, such as a display 19, and an input user device, typically a key matrix 20, all of which are coupled to the controller 16, although in other embodiments, other suitable types of output and input user interfaces also may be employed. The key matrix 20 includes various user-interface keys that are used for initiating some operation of the user information appliance 4, such as, for example, PLAY, FAST FORWARD, STOP, REWIND, and PAUSE keys, various menu scrolling keys, etc. A MARK key for marking commercial content also may be included in the key matrix 20.

The user information appliance 4 also includes various memories, such as a RAM and a ROM, shown collectively as the memory 18. The memory 18 may store temporary data and instructions, various counters and other variables, and preferably also stores various applications, routines, and operating programs 27. For example, in accordance with one embodiment of the information appliance 4, the memory 18 may store a video encoder 33, a video decoder 35, a cut detector 29, and a frame grabber 31, although other types of operating systems and application software may be employed instead and/or one or more of the applications, such as applications 33, 35, and 31, may be embodied as separate hardware components within the appliance 4, rather than as application software. As for the video encoder 19 and decoder 21 stored in the server 2, the video encoder 33 stored in information appliance 4 may be employed by the controller 16 to encode video information, and the video decoder 35 may be employed by the controller 16 to decode compressed video data, in a conventional manner. The frame grabber 31 includes software that is employed by the controller 16 to capture single frames from a video signal stream, for enabling the captured frames to be subsequently processed. The cut detector 29 detects, for example, whether a change in scene has occurred, in a known manner. In accordance with one embodiment of the invention, at least some of the routines stored in the memory 18 implement a method in accordance with this invention, to be described below in relation to FIGS. 3, 4a, and 4b. Moreover, in one embodiment of the invention, the memory 18 also stores at least some of the various counters, variables, and/or chromosomes described above in relation to the server 2, although for convenience, they will not now be further described.

Input video information originated from a source device, such as the server 2 or some other source device (e.g., a video camera, etc.) (not shown), may be received within the appliance 4 through the at least one communication interface 14. Like the information inputted into the server 2, the video information inputted into the information appliance 4 may be in digital or analog form, compressed or uncompressed, depending on, for example, the type of source device and associated external interface employed. Also like the server 2, an A/D converter 11a and a D/A converter 11b also may be included in the information appliance 4, either as part of the controller 16 or as separate components. The A/D converter 11a may be programmed by the controller 16 for enabling analog information received by the appliance 4 from an external interface, such as interface 6, to be converted into digital form, before being provided to the controller 16. The D/A converter 11b may be employed to convert digital information into corresponding analog information, before the information is outputted to the external interface 6, although, depending on the type of interface 6 employed, that information need not be so converted before being forwarded to the interface 6.

Having described the various components of the system 1, an aspect of this invention will now be described, with reference to the flow diagram of FIG. 3. In accordance with this aspect of the invention, a user can identify selected individual frames or other segments of a sample video clip as either including predetermined content, such as commercial subject matter, or as not including such predetermined content. Thereafter, the sample video clip is automatically evaluated for the presence of such predetermined content using a predetermined content detection algorithm that is a function of a number of parameters, such as the chromosome threshold values described above. Selected ones of those threshold values are then evolved, if needed, in successive iterations of the algorithm (the evolution occurs through use of a super-algorithm, such as a genetic algorithm), to increase the accuracy of the detections, until the threshold values are considered to be optimized for enabling the algorithm to detect the predetermined content with maximum accuracy amongst all employed values. It should be noted that, although the invention is described below in the context of an example in which a video clip sample is evaluated for the presence of commercial content, the invention is not intended for use only in applications for detecting commercial content. For example, in other embodiments, the method of the invention may be employed for use in detecting other types of information content of interest, such as, for example, explicit, violent, or other content types, depending on the application of interest.

Figure 3:
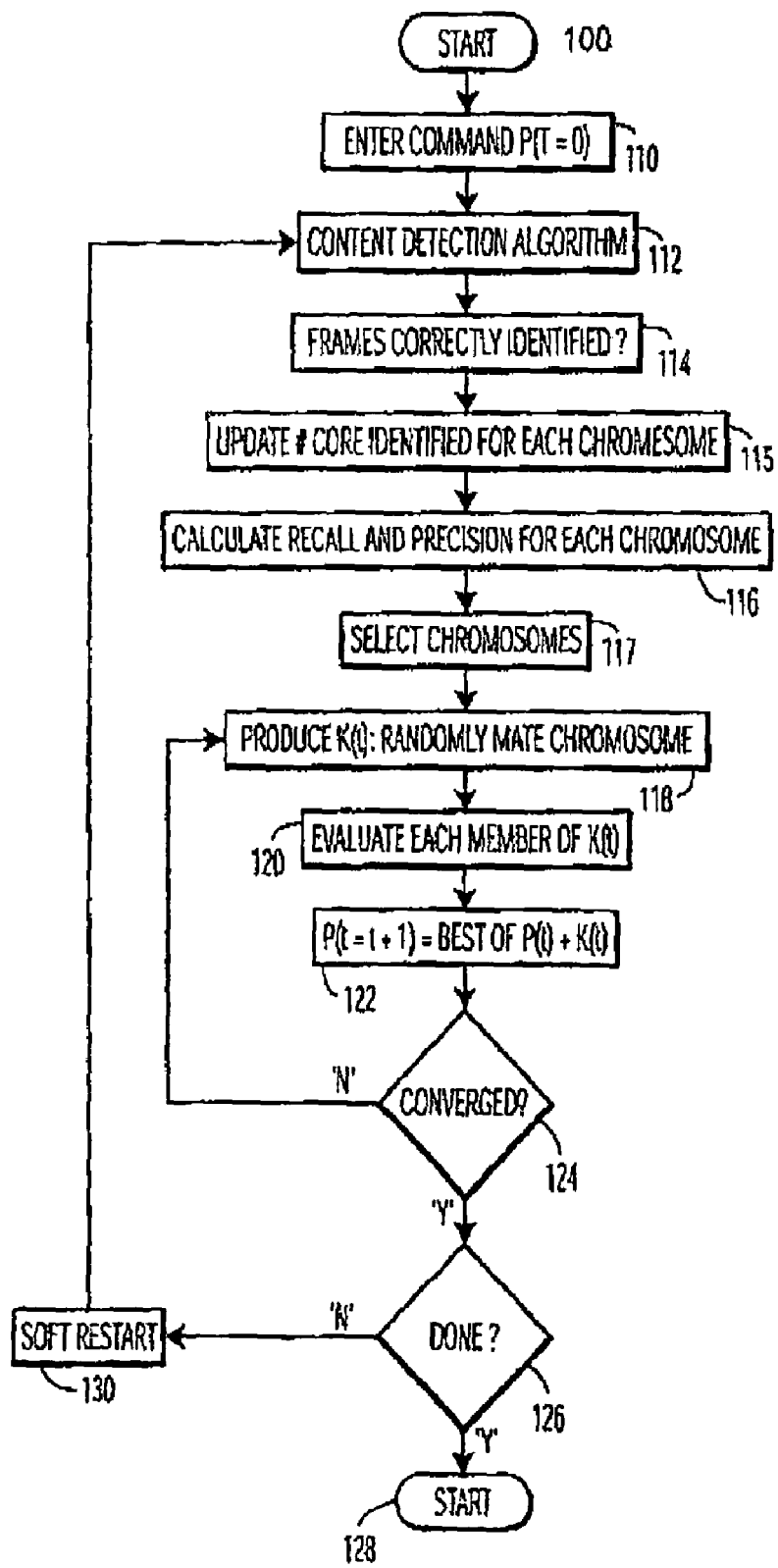
FIG. 3 is a logical flow diagram of a method in accordance with this invention for evaluating a video information stream for the presence of predetermined content, and for automatically varying parameters of the algorithm to enable the algorithm to detect the predetermined content with a maximum degree of accuracy.

Referring now to FIG. 3, in step 100 the method is started, and it is assumed that the server 2 is provided with at least one sample video clip that is stored in the memory 15, and that the sample video clip includes at least one commercial segment (as pointed out above, as used herein, the term "commercial segment" means one or more successive video frames having commercial content, and forming a single commercial) and boundaries of the commercial segments (customarily, a generous sample of video clips having a variety of commercials would be employed to ensure that robust algorithm chromosomes are determined). By example only, those boundaries may include black/unicolor frames, as described herein, wherein one or more of those frames appear (temporally) immediately before and others immediately after each commercial segment, although other suitable types of boundaries may be employed instead, depending on the type of content detection algorithm employed. It also is assumed that the sample video clip is stored in the memory 15 in association with content identifier information specifying (1) which particular frames of the clip include and/or do not include commercial content, (2) frame numbers identifying those frames, and (3) a variable Actual#CommFrames representing the total number of frames including commercial content. For example, the sample video clip and content identifier information may be downloaded from any external source through the interface 8, in which case the video clip and content identifier information are forwarded to the controller 10 and then stored by the controller 10 in the memory 15. The video clip may be, for example, a portion of a television signal or Internet file broadcast downloaded from the interface 6, a video clip uploaded from the user information appliance 4, a video clip downloaded from a particular web site, or a video signal originated from any other source (not shown) that may be coupled to the server 2. As another example, the content identifier information may be stored in the memory 15 after the sample video clip already is stored in that memory. For example, while viewing individual frames of the sample video clip on the display 13, the user may enter content identifier information specifying whether or not each individual frame includes commercial content, into the server memory 15 through the input user interface 11, and then that information is stored in association with the frame information. It further is assumed in step 100 that the thresholds of the individual chromosomes Cr1-Crn are initialized to some predetermined values (e.g., represented by a bit string), either as specified by the user or by the routine stored in memory 15, and thus an initial population P(t) of the chromosomes is provided, where, for the purposes of this description, 't' is a variable representing the population level.

Thereafter, in step 110 it is assumed that, for example, the user operates the input user interface 11 enter command information into the controller 10 specifying that the sample video clip be examined for the presence of predetermined content, namely, in this example, commercial subject matter. In response to the command information being inputted into the controller 10 in step 110, the controller 10 performs a predetermined content detection algorithm that is identified as step 112 in FIG. 3. For this exemplary embodiment, that algorithm is shown in further detail by the method steps shown in FIGS. 4a and 4b, and, is performed to evaluate the sample video clip for the presence of commercial content based on the threshold values within each chromosome of the population P(t). In a preferred embodiment of this invention, the algorithm is performed separately for each chromosome of the population P(t), so that multiple performances of the algorithm occur, either in parallel or in series with one another, and so that there is at least one performance of the algorithm for each chromosome. For convenience, the following description will be made in the context of the performance of the content detection algorithm for only a single one of the chromosomes, although it should be understood that the algorithm is performed for each chromosome separately.

Figure 4A:
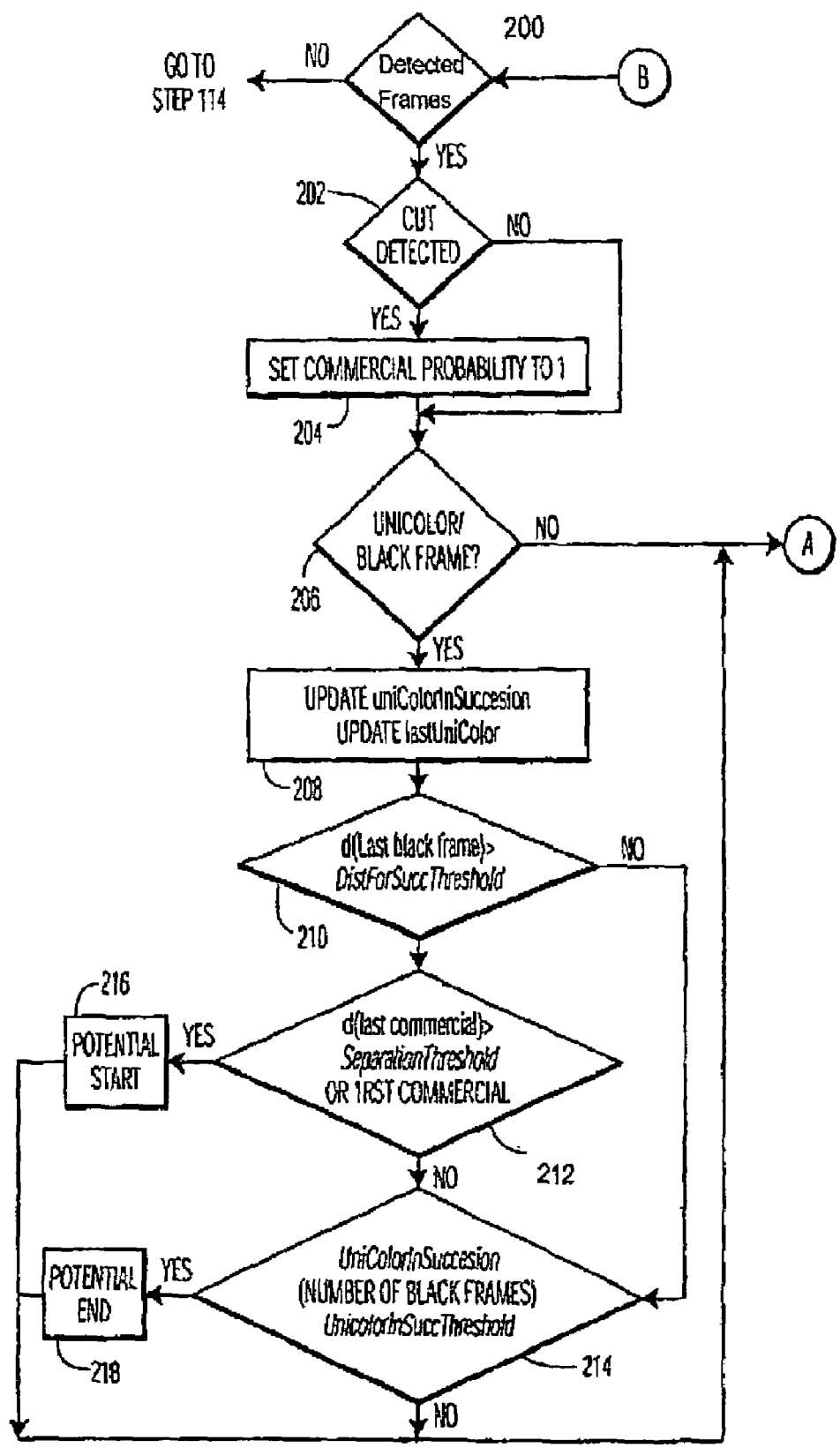
FIGS. 4a and 4b are a logical flow diagram showing in detail sub-steps performed during step 112 of FIG. 3.

In step 200 of FIG. 4a, the content detection algorithm is entered, and it is assumed that the frame grabber 23 detects a first video frame in the sample video clip, using a known frame detection technique ("Yes" in step 200). Thereafter, control passes to step 202 where the cut detector 24 determines whether or not a cut (i.e., a change in a scene or a change in content) has occurred based on the content of the detected frame relative to that of an immediately-preceding detected frame, if any, using a known cut detection technique. If no cut is detected in step 202 ("No" at step 202), then control passes to step 206 where the method continues in a manner described below. Otherwise, if a cut is detected in step 202, control passes to step 204 where the controller 10 sets the CommercialProbability variable equal to value '1'. Control then passes to step 206. It should be noted that the frame detection step 220 and cut detection step 202 may be performed using any suitable, known frame detection and cut detection techniques, respectively, such as, for example, those described in U.S. Pat. No. 6,100,941, which, as pointed out above, is incorporated by reference herein.

In step 206 the controller 10 determines whether or not the frame detected in step 200 is a black or unicolor frame, using a known black frame/unicolor frame detection technique (such as, for example, a black frame/unicolor frame technique described in U.S. Pat. No. 6,100,941 or U.S. patent application Ser. No. 09/417,288, or any other suitable black frame/unicolor frame detection technique). If the performance of step 206 results in a determination that the frame detected in step 200 is not a black or unicolor frame ("No" in step 206), control passes through connector A to step 220 of FIG. 4b, where the method then continues in a manner as will be described below. If the performance of step 206 results in a determination that the frame detected in step 200 is a black or unicolor frame ("Yes" in step 206), then control passes to step 208 where the controller 10 increments the value of counter UniColorInSuccession (originally initialized to '0' when the algorithm in step 112 is initially entered) stored in memory 15 by '1', and also updates the value of variable LastUniColor so that it represents the number of the current frame. Thereafter, a number of steps are performed to determine whether or not a potential start or ending of a commercial exists near the detected black/unicolor frame in the video clip.

In step 210 the controller 10 determines whether or not the temporal distance between the newly-detected black or unicolor frame and a last detected black/unicolor frame (if any) exceeds the value of DistForSuccThreshold. For example, the temporal distance may be calculated by first subtracting the number of the newly-detected black/unicolor frame (identified by, e.g., LastUniColor) from that of the last detected black/unicolor frame (if any), and then multiplying the subtraction result by the inverse of an applicable, predetermined frame rate (e.g., the inverse of either 25 frames/second, 30 frames/second, or 24 frames/second) to convert the subtraction result into units of time. The product of that multiplication represents the temporal distance in question, and is compared to the value of DistForSuccThreshold to determine whether or not the temporal distance exceeds that threshold value. If the performance of step 210 results in a determination of "No", which indicates that the current frame probably is not located immediately prior to a frame that includes commercial content, then control passes to step 214 which is performed in a manner as will be described below. If the performance of step 210 results in a determination of "Yes", then control passes to step 212 where the controller 10 determines whether or not the temporal distance between a last detected commercial (if any) and the newly-detected black/unicolor frame exceeds the value of the SeparationThreshold, or if no commercial segment was previously detected in the sample video clip (e.g., a first commercial segment may be present). For example, that temporal distance may be calculated by first subtracting the number of the newly-detected black/unicolor frame from the number of the last frame of a last detected commercial segment (if any was determined based on a previous performance of step 228 of FIG. 4b) (a last, black frame of a previous commercial), and then multiplying the subtraction result by the inverse of the applicable, predetermined frame rate. The product of that multiplication represents the temporal distance between the newly-detected black/unicolor frame and an ending frame of a last detected commercial, and is compared to the value of SeparationThreshold to determine whether or not the temporal distance exceeds that threshold value.

If the performance of step 212 results in a determination of "Yes", then control passes to step 216 where the controller 10 recognizes that the frame detected in step 200 is potentially adjacent to a next, beginning frame of a commercial segment. If the performance of step 212 results in a determination of "No", which indicates that the current frame likely is not located adjacent to a next, beginning frame of a commercial segment, then control passes to step 214, which will now be described.

In Step 214 the controller 10 determines whether or not the number of black/unicolor frames (e.g., UniColorInSuccession) that have been detected since the algorithm was initiated in step 112 (FIG. 3) exceeds UnicolorInSucc Threshold. If the performance of step 214 results in a determination of "Yes", then control passes to step 218 where the controller 10 recognizes that the frame detected in step 200 is potentially one of a series of black/unicolor frames following the ending of a commercial segment (i.e., the potential end of the commercial segment is recognized). If the performance of step 214 results in a determination of "No", then control passes through connector A to step 220 of FIG. 4b.

Figure 4B:
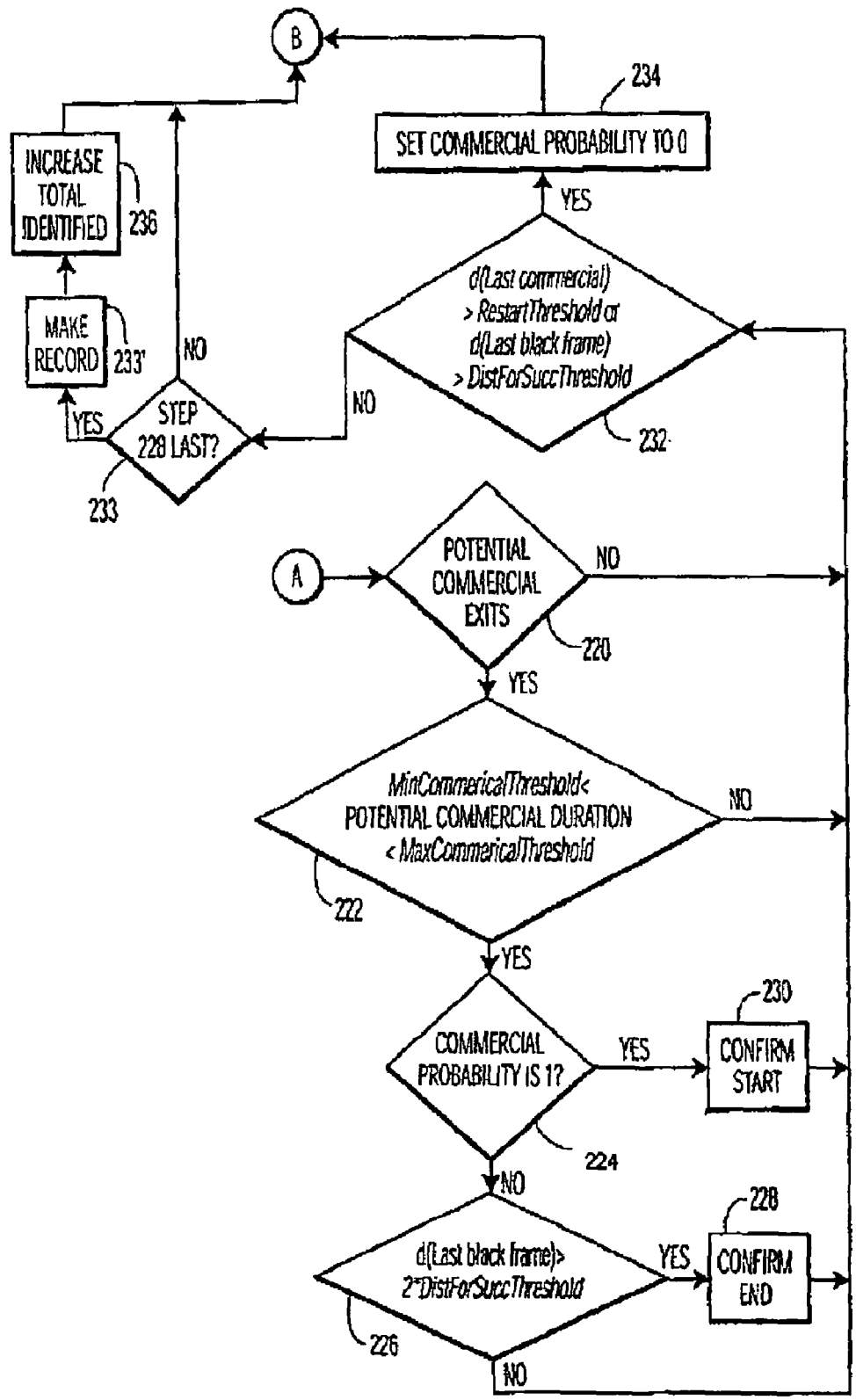

Referring to FIG. 4b, in step 220 a decision is made as to whether or not the potential presence of a commercial segment was previously determined to exist, and control then passes to either step 232 (to be described below) or step 222, based on the result of that determination. For example, if step 220 was entered into directly after a determination of "No" in step 206, then the performance of step 220 results in control being passed to step 232. If step 220 was entered directly after a potential beginning of a commercial segment was recognized in step 216 or after a potential ending of a commercial segment was recognized in step 218, then the performance of step 220 results in control being passed to step 222, which will now be described.

In step 222 the controller 10 determines whether the approximate duration of the potential commercial segment is within a predetermined time period. For example, step 222 may be performed by the controller 10 determining whether the temporal distance separating a frame last determined to be a black/unicolor frame potentially following the end of a commercial segment (a last performance of step 218) and an earlier frame determined to be potentially located adjacent to a next, beginning frame of a commercial segment (in an earlier performance step of 216), is greater than the value of the MinCommercialThreshold and less than the value of the MaxCommercialThreshold. If the performance of step 222 results in a determination of "No", then control passes to step 232. Otherwise, if the performance of step 222 results in a determination of "Yes", then control passes to step 224 where the controller 10 examines the value of the CommercialProbability variable to determine whether or not it is equal to '1'. If it is determined in step 224 that the value of the CommercialProbability variable is equal to '1', then control passes to step 230 where the controller 10 stores in the memory 15 a record confirming that the frame detected in step 200 is a black or unicolor frame that is located temporally adjacent to a next, beginning frame of a commercial segment. If it is determined in step 224 that the value of the CommercialProbability variable is not equal to '1', then control passes to step 226 where the controller 10 determines whether or not the temporal distance between the current black or unicolor frame (detected in step 206) and a last detected black/unicolor frame (if any) exceeds the product of 2*DistForSuccThreshold. If the performance of step 226 results in a determination of "Yes", which confirms that the current black/unicolor frame is a first black/unicolor frame appearing immediately after a last frame (that includes commercial content) of a commercial segment, then control passes to step 228 where the controller 10 stores in the memory 15 a record indicating such and confirming that the presence of a commercial segment ending has been detected. If the performance of step 226 results in a determination of "No", then control passes to step 232, which will now be described.

In step 232 the controller 10 determines whether or not (1) the temporal distance between the frame (if any) confirmed in step 228 or 230 and an earlier frame (if any) last confirmed in an earlier performance of step 228 or 230 exceeds the value of RestartThreshold, or (2) the temporal distance between the current black/unicolor frame and a last-detected black/unicolor frame (if any) exceeds the value of DistForSuccThreshold, wherein the temporal distances may be determined and compared to the corresponding threshold values in the manner described above. If the performance of step 232 results in a determination of "Yes", then control passes to step 234 where the controller 10 sets the value of the CommercialProbability variable to '0' to indicate that no commercial segment was detected in the previously-described method steps. Thereafter, control passes through connector B back to step 200 of FIG. 4a.

If, on the other hand, the performance of step 232 results in a determination of "No", then control passes to step 233 where, if the last confirm step performed was step 228 ("Yes" in step 233), control is passed to step 233' where the controller 10 stores information in the memory 15 specifying that the frames (identified by corresponding frame numbers) appearing temporally between the black/unicolor frame confirmed in step 228 (as being located immediately after a last frame of a commercial segment) and a black/unicolor frame which was last confirmed in earlier step 230 (as being located immediately prior to a first frame of the commercial segment), include commercial content and collectively represent a commercial segment. Thereafter, in step 236 the controller 10 increases the value of the TotalIdentified counter (originally initialized at '0' when step 112 was entered) stored in memory 15 by the number of frames identified in step 233' as including commercial content, and control then passes through connector B back to step 200 of FIG. 4a. If, on the other hand, step 230 was the last confirm step performed ("No" in step 233), control passes directly through connector B back to step 200 of FIG. 4a.

After control passes back to step 200 through connector B from either step 233, 234, or 236, step 200 is performed in the above-described manner. If the performance of that step results in there being a detection of a next video frame the sample video clip ("Yes" in step 200), then control passes to step 202 where the method then continues in the above-described manner. If no other frames are detected ("No" in step 200), then control passes to step 114 of FIG. 3, where the method then continues in the following manner.

Step 114 of FIG. 3 is entered into after the algorithm of step 112 is performed for each chromosome of the set of chromosomes of population P(t), stored in the memory 15. For example, the performance of step 112 for each of the initial chromosomes Cr1-Crn of population P(t), results in there being stored in the memory 15, for each chromosome, a respective TotalIdentified counter value representing the total number of frames (if any) in the sample video clip that were identified as including commercial content by the commercial detection algorithm employing that chromosome (see, e.g., step 236 of FIG. 4b) in step 112, and information specifying the frame numbers of the set(s) of those frames (see, e.g., step 233'). Now, in step 114 the controller 10 determines, for each individual chromosome of the population P(t), whether or not the frames (if any) identified in step 233' during the performance of step 112 for that chromosome, were correctly identified as including commercial content, by correlating the identified frames to the corresponding content identifier information (specifying whether or not the frames include commercial content) originally stored in memory 15 in step 100 of FIG. 3. For example, assuming that a particular frame was identified as including commercial content during the earlier performance of the algorithm of step 112 for a particular chromosome, and assuming that the content identifier information stored in memory 15 specifies that the same frame does indeed include commercial content, then that frame is determined in step 114 as having been correctly identified as including commercial content. A similar determination is made in step 114 for each frame identified in earlier step 233' for each chromosome. Then control passes to step 115 where the controller 10 updates the value of #CorrIdentified associated with each initial chromosome Cr1-Crn of the population P(t) stored in memory 15 so that, for each chromosome, the updated value specifies the number of frames which were determined in step 114 as having been correctly identified (as including commercial content during the performance of step 112) for that chromosome. As a result, a separate value of #CorrIdentified is provided for each chromosome (to indicate the number of frames correctly identified during the algorithm performed using that chromosome). After step 115 is performed, control passes to step 116 where values for the counters #CorrIdentified (updated in step 115) and TotalIdentified (updated in step 112) associated with each chromosome are employed by the controller 10 to determine a Recall and a Precision for that chromosome, using the following formulas F1 and F2, respectively:

$$\text{Recall} = \#\text{CorrIdentified}/\text{Actual}\#\text{CommFrames} \quad (F1)$$

$$\text{Precision} = \#\text{CorrIdentified}/\text{TotalIdentified} \quad (F2).$$

For example, assuming that the earlier performance of steps 112 and 115 for each chromosome C1-Cn of initial population P(t) results in a determination of the counter values #CorrIdentified and TotalIdentified shown in Table I below for those chromosomes, and that the value of Actual#CommFrames is 90 for each chromosome, then the performance of the formulas F1 and F2 in step 116 results in the Recall and Precision values shown in Table I being calculated for the corresponding chromosomes Cr1-Crn. Those values are stored in the memory 15 by the controller 10.

TABLE I

| Cr# | # Corr-Identified | Actual#Comm-Frames | Total-Identified | Recall | Precision |
|-----|-------------------|--------------------|------------------|--------|-----------|
| Cr1 | 80 | 90 | 100 | 0.888 | 0.8 |
| Cr2 | 90 | 90 | 90 | 1.0 | 1.0 |
| Crn | 75 | 90 | 95 | 0.833 | 0.789 |

After step 116 is performed, control passes to step 117 where, in accordance with one embodiment of the invention, the controller 10 selects certain ones of the chromosomes by employing a predetermined selection strategy that is based on the Recall and Precision values determined in step 116. Any suitable type of selection strategy may be employed in step 117, such as, for example, a stochastic selection process, a random process with a probability of selection that is proportional to fitness, a strategy which selects chromosomes yielding the highest 50% of all of the Precision and Recall determined in step 116, a strategy which selects chromosomes yielding Recall and Precision values equaling or exceeding a predetermined value, or another suitable fitness selection strategy, etc., depending on predetermined operating criteria. In this regard, reference may be had to the publications entitled "Genetic Algorithms And Evolutionary Programming", Artificial Intelligence: A Modem Approach, 1995, Chapter 20.8, pages 619-621, by Stuart Russell et al. (hereinafter "the Genetic Algorithms publication"), "The CHC Adaptive Search Algorithm: How To Have Safe Search When Engaging In Nontraditional Genetic Recombination", Foundations Of Genetic Algorithms, 1991, pages 265-283, by Larry Eshelman (hereinafter "the Eshelman publication"), for a description of examples of fitness selection strategies that may be employed in step 117, although other suitable strategies may be employed instead, and the manner in which the controller 10 would be programmed to perform such strategies would be readily appreciated by one skilled in the relevant art in view of this description. Reference also may be had to U.S. Pat. No. 5,390,283, "Method for Optimizing of a Pick and Place Machine", by Larry Eshelman and James D. Schaffer, issued on Feb. 14, 1995, for a description of the use of a CHC algorithm for determining a near-optimal allocation of components in a "pick and place" machine. That U.S. patent is incorporated by reference herein in its entirety.

In the present exemplary embodiment, and for the purposes of this description, step 117 is performed by determining the fitness (F) of each chromosome, using the following formula (F1), and by then selecting the chromosomes yielding the highest 50% of all of the calculated fitness values (F):

(F)=(2*(Precision)(Recall))/(Precision+Recall)    F1.

After step 117 is performed, control passes to step 118 where, according to one embodiment of the invention, each individual chromosome selected in step 117 is randomly paired with another one of those selected chromosomes, and then mated with that other selected chromosome, if the paired chromosomes are determined to be non-incestuous. For example, in one embodiment, after the chromosomes are paired together in step 118 (FIG. 5a shows an example of two randomly-paired chromosomes Cr1 and Crn), a determination is made as to whether or not the paired chromosomes are incestuous by examining, for each pair, whether or not the values of chromosomes of the pair differ from one another (e.g., as measured by a Hamming distance) by at least an incest threshold value, such as a predetermined bit string length or some other suitable value. As an example, six of the corresponding bits of the chromosomes pair in FIG. 5a differ from one another, and thus, in a case where the incest threshold value is ¼ of the bit string length, the performance of that portion of step 118 results in a determination that those chromosomes are not incestuous. Thereafter, in accordance with one embodiment of the invention, the chromosomes determined to be non-incestuous are then mated by randomly choosing a cross-over point 300, and then swapping the bits of the pair appearing after the cross-over point so that offspring chromosomes are generated (or this may be accomplished using HUX; see the Eshelman publication)). FIG. 5b shows an example of such offspring chromosomes Crk1 and Crk2 generated by the parent chromosomes of FIG. 5a (step 118). The crossover operation may be performed in any suitable manner known in the art, such as that described in relevant portions of the Eshelman publication referred to above.

In accordance with another embodiment of the invention, the production of offspring in step 118 may be performed by, for example, randomly mutating the value of each chromosome by flipping a predetermined portion (e.g., 35%) of the bits of each chromosome, at random (with independent probability), in a manner as known in the art. FIG. 5c shows an example of one of the parent chromosomes Cr1 of FIG. 5a and an offspring chromosome Crk1 resulting from the mutation of that parent chromosome. In still another embodiment of this invention, the mutation performed during step 118 may be performed by randomly choosing a cross-over point and swapping bits in the above-described manner, and then randomly mutating the resultant bit strings (individual bits), or vice versa, in the manner described above.

The performance of step 118 results in there being a plurality of offspring chromosomes Crk1-Crki provided (which hereinafter also are referred to collectively as offspring population K(t)) (assuming, in the case of sexual reproduction, that at least one of the parent chromosome pairs was determined to be non-incestuous in that step, wherein for that embodiment each pair of offspring chromosomes was generated from a corresponding pair of parent chromosomes). After step 118 is performed, control passes to step 120 where each of the chromosomes Crk1-Crki is employed, in lieu of the parent chromosomes Cr1-Crn of initial population P(t), in the content detection algorithm described above in relation to step 112, and then, after that algorithm is performed for each chromosome Crk1-Crki, steps that are the same as steps 113-116 are performed for each of those chromosomes Crk1-Crki. That is, step 120 is performed in the same manner as steps 112-116 described above, except that the offspring chromosomes Crk1-Crki are employed in those steps in place of the parent chromosomes Cr1-Crn of initial population P(t). Since steps 112-116 were already described above, for convenience a further detailed description of those steps will not be made herein. It should be clear to one skilled in the relevant art in view of this description, however, how those steps are performed employing the offspring chromosomes Crk1-Crki. The performance of step 120 results in a determination of a fitness value (F) yielded for each offspring chromosome Crk1-Crki (as in step 116), in the same manner as described above.

Thereafter, control passes to step 122 where, in accordance with one embodiment of the invention, another selection of chromosomes is made, but this time the selection is made from amongst all chromosomes of the previous chromosome population P(t) (e.g., Cr1-Crn) and all chromosomes of offspring population K(t) (e.g., Crk1-Crki), to generate a new population P(t=t+1), by employing the same chromosome fitness selection strategy as that described above in relation to step 117, or any other suitable existing or later developed selection strategy. Thereafter, in step 124 a convergence determination is made, by determining whether (a) the value of the incest threshold is equal to '0' and (b) the fitness (F) of each chromosome selected in step 122 is the same. If either (a) or (b) is not true, then a determination is made as to whether there were no chromosomes selected from population K(t) (i.e., none survived) in step 122. If none were selected in that step, then the value of the incest threshold is decreased by '1' ('N' in step 124), and control then passes back to step 118 where the method then proceeds therefrom in the above described manner, but to mate the chromosomes of the newly generated population. If, on the other hand, both (a) and (b) are determined to be true in step 124 ('Y' in step 124), then control passes to step 126.

In Step 126, a determination is made as to whether or not the method should be terminated. In accordance with one embodiment of the invention, that step is performed by determining if either (i) a predetermined number of chromosomes of offspring population K(t) have been evaluated in step 120 since the method was first began in step 100, or (ii) a restart step 130 (described below) has been performed a predetermined number of times since the method began in step 100. In other embodiments of the invention, step 126 maybe performed to determine if both of the conditions (i) and (ii) have been satisfied, or, in other embodiments, the determination may be made as to only one of the conditions (i) and (ii), although, it should be noted that other suitable types of decisions besides those described herein may be employed instead, depending on applicable operating criteria.

If the performance of step 126 results in a determination of 'Yes' ('Y' in step 126), control passes to step 128, which will be described below. Otherwise, if step 126 results in a determination of 'No' ('N' at step 126), control passes to step 130, where a soft restart procedure is performed. In a preferred embodiment of the invention, the soft restart procedure of step 130 is performed by copying the chromosome (of the population P(t=t+1)) which, among all of the chromosomes of population P(t) evaluated in the previous performance of step 116 and offspring population K(t) evaluated in the previous performance of step 120, yielded the highest fitness (F) value (among all chromosomes of newly generated population P(t=t+1)), to provide plural (e.g., fifty) copies of that chromosome (also referred to herein as a current best one of all of those chromosome). Preferably, each of the resulting copies, except one, is then mutated by flipping a predetermined proportion (e.g., 35%) of the bits of the copy, at random without replacement. As a result of step 130, a single, non-mutated copy of the chromosome which yielded the highest fitness (F) value, and a plurality of mutated versions of that copied chromosome, are provided. Those chromosomes (including the non-mutated and mutated copies) collectively form a new chromosome population P(t). Thereafter, control passes from step 130 back to step 112, wherein the method then continues in the above described manner, but with the new chromosome population P(t) being employed for the various thresholds of the algorithm.

Step 128 of FIG. 3 will now be described. In step 128 the controller 10 stores information in the memory 15 specifying that the threshold values of a current best chromosome remaining in the population P(t=t+1) after both steps 124 and 126 consecutively resulted in determinations of 'Yes', be employed in future operations for detecting the presence of commercial content in video streams. Those threshold values, which in this example are ST2, UIST2, MinCT2, MaxCT2, RT2, and DFST2 (FIG. 2), are considered to be the best (e.g., "optimum" or high performance) of all the chromosome threshold values UIST1-UISTn, MinCT1-MinCTn, MaxCT1-MaxCTn, RT1-RTn, DFST1-DFSTn (FIG. 2), respectively, for enabling the content detection algorithm represented in FIGS. 4a and 4b to detect commercial content in a video information stream with a maximum degree of accuracy.

Sometime later, it is assumed that a user of the server 2 operates the input user interface 11 to enter information into the server 2 specifying that a selected video stream, such as the video clip originally provided in the memory 15 in step 100 or another video information signal provided to the server 2 (e.g., a downloaded or uploaded video clip, a received broadcast video information stream, or one or more otherwise provided video clips or other video segments, etc.), be evaluated for the presence of, for example, commercial subject matter. As a result, the controller 10 responds by retrieving the optimized chromosome threshold values ST2, UIST2, MinCT2, MaxCT2, RT2, and DFST2 identified in step 128 and then performing the content detection algorithm shown in FIGS. 4a and 4b, using the retrieved values for the appropriate thresholds SeparationThreshold, UniColorInSuccThreshold, MinCommercialThreshold, MaxCommercialThreshold, RestartThreshold, and DistForSuccThreshold, respectively, employed in that algorithm. In this manner, the video information is evaluated for the presence of commercial content, based on those thresholds. The use of those optimized threshold values enables the content detection algorithm to detect commercial content in the video information with a maximum degree of accuracy. Thereafter, the results of evaluation of the video information may then be employed as desired (e.g., to delete or replace the commercial content from the signal, etc.).

The optimized threshold values identified in step 128 also may be provided to other devices, such as the user information appliance 4, for enabling those threshold values to be employed in the content detection algorithm in those devices. For example, instead of or in addition to employing the optimized chromosome threshold values in the content detection algorithm in the server 2, those values may be downloaded or otherwise provided to the user information appliance 4 for storage in the memory 18 of that appliance 4. Thereafter, those values may be retrieved by the controller 16 for use in performing the content detection algorithm (of FIGS. 4a and 4b), to evaluate a selected video stream provided in the appliance 4 for the presence of commercial content, in a similar manner as described above in connection with the server 2. In other embodiments, software representing a content detection algorithm, such as, for example, the commercial detection algorithm shown in FIGS. 4a and 4b, can be downloaded or be otherwise provided from the server 2 to user information appliances 4, in association with, or separately from, the optimized chromosome threshold values, and those values can then be employed in the algorithm in the information appliances to detect predetermined content an in information stream. Software representing the overall method of FIG. 3 also may be downloaded or be otherwise provided from server 2 to information appliances 4, or be pre-stored in those appliances 4, for enabling that method to be performed in those devices for determining optimum chromosome threshold values, which can then be uploaded or be otherwise provided back to the server 2, if desired, or employed in a suitable content detection algorithm in the appliances 4.

It should be noted that, although the invention is described in the context of step 117 (and part of step 120) being performed to select chromosomes based on their fitnesses yielded as a function of Recall and Precision values, in other embodiments those selections may be made based on an evaluation of only Recall values or only Precision values yielded by chromosomes, or based on any other suitable measure of accuracy, and the measures may be of a scalar or vector type.

It also should be noted that, although the invention is described in the context of the content detection algorithm being performed to identify the presence of commercials based on a black frame or unicolor frame detection technique, the invention is not limited for use with only that technique or for detecting only commercial content. It also is within the scope of this invention to employ any other suitable types of now existing or later developed techniques which can be used for detecting any type of predetermined content in analog or digital video signals or any other types of media information (e.g., audio) besides/in addition to video information (examples of at least some other techniques involving video information were discussed above), and any type of low-level, mid-level, or hi-level (e.g., the presence of multiple black frames in succession) features that can be extracted, either in the compressed or uncompressed domain, may be employed in those techniques. As can be appreciated by one skilled in the art in view of this description, in cases where other types of techniques are employed besides the black/unicolor frame detection technique referred to in the above description, each technique would employ appropriate types of chromosomes that are suitable for use as parameters in the respective techniques. It should therefore be appreciated that the method of the present invention may be employed to optimize the detection of any type of desired or undesired content, included in any type of media information, and is not limited for use only in conjunction with detecting commercial content in video information. Moreover, as used herein, the phrase "information stream" is not intended to limit the invention to on-line applications. Indeed, it is within the scope of this invention to evaluate any applicable type of media information, such as, for example, video information, audio information, combination video/audio information, etc., within any suitable type of environment, whether on-line or off-line, and an information stream may include one or more of types of such information, depending on the application of interest and predetermined operating criteria.

Moreover, in one embodiment of the invention, each chromosome may include multiple sets of parameters, wherein each set can be used in a corresponding technique. For example, in addition to the various threshold values shown in FIG. 2 (which can be used in the algorithm of step 112 described above), each chromosome Cr1-Crn (and offspring chromosome) may also include appropriate parameter values for use in other types of techniques, such as an average cut frame distance detection technique, an average cut frame distance trend detection technique, a brand name detection technique, another type of black frame detection technique, etc., and each technique may be run separately for each chromosome, using the appropriate parameter values for that technique. In one embodiment, a user may select (in initial step 100) which technique is desired to be employed, and then, as a result, all individual chromosome parameter values besides those which are suitable for use in the selected technique (e.g., all values besides those shown in FIG. 2, in a case where an algorithm such as that shown in FIGS. 4a and 4b is selected) are initialized to '0', so that no results are obtained from the non-selected techniques. In other embodiments, those parameter values need not be set to '0', and each technique may be performed as a separate content detection algorithm for yielding separate results. Chromosomes that include genes specifying other types of information besides thresholds also may be employed in accordance with this invention. For example, a gene may specify that a color histogram should be computed by algorithm A, B, C, or D (not shown). Other genes may specify alternate ways to combine selected features into a final decision about content classification. Also, the chromosome values need not be represented in bit string form, and may instead be represented in any other suitable form. It should therefore be clear that the present invention is not limited to being used only in conjunction with chromosomes that include threshold values represented by bit strings, as described herein.

It also should be noted that, although the invention is described in the context of the high performance chromosome threshold values being determined by the server 2, broadly construed, the invention is not so limited. For example, as described above, it also is within the scope of this invention for the method depicted in FIGS. 3, 4a, and 4b to be performed within other suitable devices, such as the user information appliance 4. In those embodiments, the method may be performed by evaluating a sample video clip within the devices (e.g., appliance 4), in the above-described manner, and the sample video clip may be provided in the devices from any source, such as the server 2. Also, in other embodiments, the threshold values employed in the algorithm within server 2 may be provided to the server 2 from an external source, such as information appliances 4.

Although the foregoing description has been described in the context of the method of the invention being implemented using software instructions, in other embodiments hardware circuitry may be used in place of such instructions for implementing the method of the invention. The particular types of circuitry employed would be readily appreciated by those of ordinary skill in the art, in view of this description. Also, while the invention has been described in the context of employing the above-described genetic algorithm to evolve the chromosome values used in a content detection algorithm, in other embodiments, other suitable types of genetic or other types of search algorithms may be employed instead, depending on the application of interest. A multitude of evolutionary algorithms are available that may be employed in accordance with this invention, and the particular choice of evolutionary algorithm for use in this invention is optional. It should therefore be understood that the invention is not limited for use only with the genetic algorithm described herein, and that the use of other types of evolutionary algorithms would be evident to one of ordinary skill in the art in the context of this disclosure.

It should further be noted that, although the invention is described in the context of the method selecting chromosomes based on their fitness in step 117 of FIG. 3, in another embodiment of the invention, no such selection need be performed, and the selection of chromosomes only occurs in step 122 which is performed to select amongst a present group of parent and offspring chromosomes. As can be appreciated in view of this description, in that embodiment, step 118 is performed to mate chromosomes from the present population being evaluated.

As has been described in the foregoing description, the present invention provides a novel method for automatically evolving parameter values until those values substantially maximize the accuracy of a media content detection algorithm that is a function of those parameters. As a result, the thresholds enable the algorithm to detect predetermined content in a media information stream with a maximum degree of accuracy. This method is advantageous in that it improves the accuracy of such content detection algorithms automatically, and therefore relieves users of the burden of having to manually select appropriate threshold values. Moreover, by virtue of determining the optimum threshold values automatically, the method of the invention can circumvent attempts made by commercial producers to prevent the successful detection of the commercials by modifying their broadcast commercials.

While the invention has been particularly shown and described with respect to preferred embodiments thereof, it will be understood by those skilled in the art that changes in form and details may be made therein without departing from the scope and spirit of the invention.

What is claimed is:

1. A method for detecting predetermined content in a media information stream, comprising:
   receiving an algorithm for detecting predetermined content in the media information stream, the algorithm being a function of a set of parameters;
   performing the algorithm at least once to detect the predetermined content in the media information stream, while employing a respective set of parameters in the algorithm for each performance thereof;
   automatically evolving at least one respective set of parameters employed in the algorithm to maximize the degree of accuracy at which the algorithm detects the predetermined content in the media information stream;
   repeating the performing and evolving step until the at least one respective set of parameters employed in the algorithm is optimized; and
   implementing in a machine the algorithm with at least one respective set of the optimized parameters to detect predetermined content in the media information stream.

2. A method as set forth in claim 1, wherein the media information stream includes at least one of video and audio information, and the predetermined content includes desired or undesired content.

3. A method as set forth in claim 1, wherein the algorithm detects the predetermined content based on a detection of at least one predetermined feature derived from the media information stream.

4. A method as set forth in claim 1, wherein the step of automatically evolving includes performing a genetic algorithm to evolve the at least one respective set of parameters.

5. A method as set forth in claim 1, wherein the media information stream includes a video information stream divided into a plurality of frames, the predetermined content includes at least one commercial, and the algorithm includes the steps of:
   detecting a plurality of black or unicolor frames in the video information stream;
   identifying the presence of a beginning portion of a commercial based on the detection of at least one of the plurality of black or unicolor frames; and
   identifying the presence of an ending portion of the commercial based on the detection of at least one other of the plurality of black or unicolor frames.

6. A method as set forth in claim 1, wherein the step of automatically evolving comprises the steps of:
   determining the accuracy at which the algorithm detects the predetermined content in the media information stream for each performance of the algorithm;
   selecting at least one of the respective sets of parameters, based on a result of the step of determining the accuracy; and
   producing at least one offspring set of parameters based on the at least one set of parameters selected in the selecting step.

7. A method as set forth in claim 6, wherein the step of automatically evolving further comprises the steps of:
   further performing the algorithm at least once to detect the presence of the predetermined content in the media information stream, while employing a respective offspring set of parameters, produced in the producing step, in the algorithm for each further performance thereof;
   determining the accuracy at which the algorithm detects the predetermined content in the media information stream for each further performance of the algorithm; and
   further selecting one or more of at least one respective set of parameters selected in the selecting step and at least one offspring set of parameters produced in the producing step, based on a result of that step of determining.

8. A method as set forth in claim 7, wherein the step of automatically evolving further comprises the steps of:
   determining if there is a convergence of all sets of parameters remaining after the further selecting step; and
   if there is a convergence, storing a record of at least one of those sets of parameters selected in the further selecting step.

9. A method as set forth in claim 6, wherein the step of producing comprises:
   pairing randomly-selected ones of the sets of parameters selected in the selecting step;
   determining if the sets of parameters paired in the pairing step are incestuous; and
   for each paired sets of parameters determined to be non-incestuous, swapping one or more values of the parameters of those sets with one another.

10. A method as set forth in claim 9, wherein the step of determining if the sets of parameters paired in the pairing step are incestuous comprises:
    determining a number of corresponding parameter values of each paired sets of parameters, which differ from one another, if any; and
    determining if the number of corresponding parameter values determined to be differing from one another is less than a predetermined incest threshold.

11. A method as set forth in claim 7, wherein the step of automatically evolving further comprises the steps of:
    determining if there is a convergence of all sets of parameters remaining after the further selecting step; and
    if there is no convergence, mutating at least one value of a most optimum one of all the sets of parameters remaining after the further selecting step, to produce plural mutated versions of the most optimum set of parameters; and performing at least some steps of the method again, beginning with performing the algorithm, but plural times, to detect the presence of the predetermined content in the media information stream while employing the most optimum set of parameters and the mutated versions of the most optimum set of parameters, in respective performances of the algorithm.

12. A method as set forth in claim 11, wherein the step of mutating comprises:

producing plural copies of the most optimum set of parameters; and changing at least one parameter value of each of the plural copies of the most optimum set of parameters.

13. A method as set forth in claim 8, wherein the step of producing comprises:

pairing randomly-selected ones of the sets of parameters selected in the selecting step;

determining if the sets of parameters paired in the pairing step are incestuous by:

determining a number of corresponding parameter values of each paired sets of parameters, which differ from one another, if any, and determining if the number of corresponding parameter values determined to be differing from one another is less than a predetermined incest threshold; and for each paired sets of parameters determined to be non-incestuous, swapping at least corresponding values of the parameters of those sets with one another, wherein the step of determining if there is a convergence comprises at least one of:

determining if the predetermined incest threshold is equal to a predetermined value; and determining if performances of the algorithm employing the sets of parameters remaining after the fUrther selecting step each result in detections of the predetermined content with substantially a same degree of accuracy.

14. A method as set forth in claim 13, and further comprising:

determining if any offspring sets of parameters remain after the further selecting step is performed; and if no offspring set of parameters remains, decreasing the predetermined incest threshold by a predetermined reduction value.

15. A method as set forth in claim 8, wherein if there is a convergence of all of the sets of parameters remaining after the further selecting step, performing at least one of:

determining if the method has been performed a predetermined number of times; and determining if a predetermined number of offspring sets of parameters has been produced, and wherein if either of those determining steps results in an affirmative determination, performing the step of storing.

16. A method as set forth in claim 1, wherein the step of automatically evolving includes evolving the at least one respective set of parameters employed in the algorithm to generate an evolved set of parameters which is optimized to enable the algorithm to detect the predetermined content in the media information stream with a maximum degree of accuracy.

17. A method as set forth in claim 16, and further comprising the step of forwarding at least one of the algorithm and the evolved set of parameters to a predetermined destination.

18. A method for evaluating a media information stream, comprising the steps of:

performing one or more algorithms, each to detect the presence of predetermined content in the media information stream, wherein each algorithm is a function of a corresponding chromosome; and automatically determining a value, for the chromosome of at least one of the algorithms, which enables that algorithm to detect the presence of the predetermined content in the media information stream with an increased degree of accuracy relative to the accuracy achieved when other values are employed.

19. An apparatus for evaluating a media information stream, comprising:

a memory for storing a media information stream and a program, at least a portion of the program including instructions for performing a method for optimizing the performance of an algorithm for detecting predetermined content in a media information stream, the algorithm being a function of a set of parameters; and a controller coupled to said memory, said controller being operable under the control of the program stored in said memory for (a) performing the algorithm at least once to detect the predetermined content in the media information stream stored by said memory, while employing a respective set of parameters in the algorithm for each performance thereof, and (b) automatically evolving at least one respective set of parameters employed in the algorithm to maximize the degree of accuracy at which the algorithm detects the predetermined content in the media information stream.

20. An apparatus as set forth in claim 19, wherein the media information stream includes video information.

21. An apparatus as set forth in claim 19, wherein at least a portion of the program includes a genetic algorithm, and said controller operates under the control of the program to automatically evolve the at least one respective set of parameters by performing the genetic algorithm.

22. An apparatus as set forth in claim 19, wherein said controller operates under the control of the program to perform the automatically evolving by:

determining the accuracy at which the algorithm detects the predetermined content in the media information stream for each performance of the algorithm;

selecting at least one of the respective sets of parameters, based on a result of the determining; and producing at least one offspring set of parameters based on the at least one set of parameters selected in the selecting.

23. An apparatus as set forth in claim 22, wherein said controller also operates under the control of the program to further perform the evolving by:

further performing the algorithm at least once to detect the presence of the predetermined content in the media information stream, while employing a respective offspring set of parameters, produced in the producing, in the algorithm for each further performance thereof;

determining the accuracy at which the algorithm detects the predetermined content in the media information stream for each further performance of the algorithm; and further selecting one or more of at least one respective set of parameters selected in the selecting and at least one offspring set of parameters produced in the producing, based on a result of that determining.

24. An apparatus as set forth in claim 23, wherein said controller also operates under the control of the program to further perform the evolving by:
determining if there is a convergence of all sets of parameters remaining after the further selecting; and
if there is a convergence, storing a record of at least one of those sets of parameters selected in the further selecting.

25. An apparatus as set forth in claim 23, wherein said controller also operates under the control of the program to further perform the evolving by:
determining if there is a convergence of all sets of parameters remaining after the further selecting; and
if there is no convergence,
mutating a most optimum one of all the sets of parameters remaining after the further selecting, to produce plural mutated versions of the most optimum set of parameters; and
performing at least some steps of the method again, beginning with performing the algorithm, but plural times, to detect the presence of the predetermined content in the media information stream while employing the most optimum set of parameters and the mutated versions of the most optimum set of parameters, in respective performances of the algorithm.

26. An apparatus as set forth in claim 19, wherein said controller performs the evolving to generate an evolved set of parameters which is optimized to enable the algorithm to detect the predetermined content in the media information stream with a maximum degree of accuracy.

27. An apparatus as set forth in claim 26, and further comprising an interface coupled to said controller, wherein said controller is operable for forwarding at least one of the evolved set of parameters and information representing the algorithm through the interface towards at least one external destination coupled to that interface.

28. An apparatus as set forth in claim 27, wherein the apparatus includes a server, and the external destination includes an information appliance.

29. An apparatus for optimizing the performance of an algorithm for detecting predetermined content in a media information stream, the algorithm being a function of a set of parameters, the apparatus comprising:
means for performing the algorithm at least once to detect the predetermined content in the media information stream, while employing a respective set of parameters in the algorithm for each performance thereof; and
means for automatically evolving at least one respective set of parameters employed in the algorithm to maximize the degree of accuracy at which the algorithm detects the predetermined content in the media information stream.

30. A program product comprising computer readable-code which, when executed, performs a method for optimizing the performance of an algorithm for detecting predetermined content in a media information stream, the algorithm being a function of a set of parameters, the method comprising the steps of:
performing the algorithm at least once to detect the predetermined content in the media information stream, while employing a respective set of parameters in the algorithm for each performance thereof; and
automatically evolving at least one respective set of parameters employed in the algorithm to maximize the degree of accuracy at which the algorithm detects the predetermined content in the media information stream.

31. A storage medium storing a program having computer readable-code which, when executed, performs a method for optimizing the performance of an algorithm for detecting predetermined content in a media information stream, the algorithm being a function of a set of parameters, the method comprising the steps of:
performing the algorithm at least once to detect the predetermined content in the media information stream, while employing a respective set of parameters in the algorithm for each performance thereof; and
automatically evolving at least one respective set of parameters employed in the algorithm to maximize the degree of accuracy at which the algorithm detects the predetermined content in the media information stream.

32. A system for exchanging information, comprising:
at least one first information apparatus; and
at least one second information apparatus, comprising:
an interface, coupled to said first information apparatus through an external communication interface,
a memory storing at least a program, and
a controller coupled to said memory and said interface, said controller operating under the control of the program stored in said memory for performing a method comprising (a) performing an algorithm at least twice to detect predetermined content in a provided media information stream, while employing a respective set of parameters in the algorithm for each performance thereof, wherein the algorithm is a function of the set of parameters, (b) automatically evolving at least one respective set of parameters employed in the algorithm to determine an optimum set of parameters which maximizes the degree of accuracy at which the algorithm detects the predetermined content in the media information stream, and (c) forwarding information representing at least one of the algorithm and the optimum set of parameters to the at least one first information apparatus through the interface and the external communication interface.

33. A system as set forth in claim 32, wherein the first information apparatus is an information appliance, and the second information apparatus is a server.

34. A system as set forth in claim 32, wherein the first information apparatus is a server, and the second information apparatus is an information appliance.

35. A system as set forth in claim 32, wherein the first information apparatus comprises:
a further interface, coupled to said interface of said second information apparatus through the external communication interface; and
a further controller coupled to said further interface, said further controller being responsive to said further interface receiving the information from said second information apparatus for at least one of storing the information in an associated further memory and performing the algorithm, while employing the optimum set of parameters in the algorithm, to detect the predetermined content in a provided information stream.

36. A system as set forth in claim 35, wherein the first information apparatus is an information appliance, and the second information apparatus is a server.

37. A system as set forth in claim 32, wherein the first information apparatus is operable for providing the information stream to said controller through said interface and said external communication interface, and wherein said controller performs the method after receiving that provided information stream.

38. A system as set forth in claim 37, wherein the first information apparatus is an information appliance, and the second information apparatus is a server.

39. A system as set forth in claim 37, wherein the first information apparatus is a server, and the second information apparatus is an information appliance.

* * * * *